Feb. 3. 1925.

R. W. CHAPMAN 1,525,268

ELECTRICAL THERAPEUTIC APPARATUS

Filed May 24, 1920

Inventor.
Ralph W. Chapman
by Heard Smith Trumant
Attys

Feb. 3, 1925.

R. W. CHAPMAN 1,525,268

ELECTRICAL THERAPEUTIC APPARATUS

Filed May 24, 1920    2 Sheets-Sheet 2

Inventor,
Ralph W. Chapman by Heard Smith Trumant

Attys.

Patented Feb. 3, 1925.

1,525,268

UNITED STATES PATENT OFFICE.

RALPH W. CHAPMAN, OF OLDTOWN, MAINE, ASSIGNOR TO T. M. CHAPMAN'S SONS COMPANY, OF OLDTOWN, MAINE, A CORPORATION OF MAINE.

ELECTRICAL THERAPEUTIC APPARATUS.

Application filed May 24, 1920. Serial No. 383,652.

*To all whom it may concern:*

Be it known that I, RALPH W. CHAPMAN, a citizen of the United States, residing at Oldtown, county of Penobscot, State of Maine, have invented an Improvement in Electrical Therapeutic Apparatus, of which the following description, in connection with the accompanying drawing, is a specification, like characters on the drawing representing like parts.

This invention relates to electrical therapeutic apparatus of that type adapted to produce a sinusoidal current, and especially to apparatus of the type illustrated and described in my United States Patent No. 1,268,545, dated June 4, 1918.

The device illustrated in said patent comprises a plurality of magnets, a plurality of coils connected in series and arranged to rotate in proximity to said magnets, whereby a current is induced in said coils, and means to move the magnets toward and from the coils thereby to produce the surging or varying current.

It is an object of my present invention to change the structure and relation of the parts shown in my above-mentioned patent and produce a machine which is very compact so that it will take up very little space.

In order to give an understanding of my invention I have illustrated in the drawings a selected embodiment thereof which will now be described, after which the novel features will be pointed out in the appended claims.

Fig. 1 of the drawings is a view partly in section showing a device embodying my invention.

Fig. 2 is a reduced view on the line 2—2 Fig. 1 looking to the left showing the magnets.

Fig. 3 is a similar view on the line 2—2 looking to the right and showing the coils;

Fig. 4 is a diagrammatic view showing the wiring of the coils and collector ring;

Fig. 5 is a sectional view through the collector ring;

Fig. 6 is a section on the line 6—6, Fig. 5;

Fig. 7 is a view of the insulating washer used between the sections of the ring.

Figure 1:
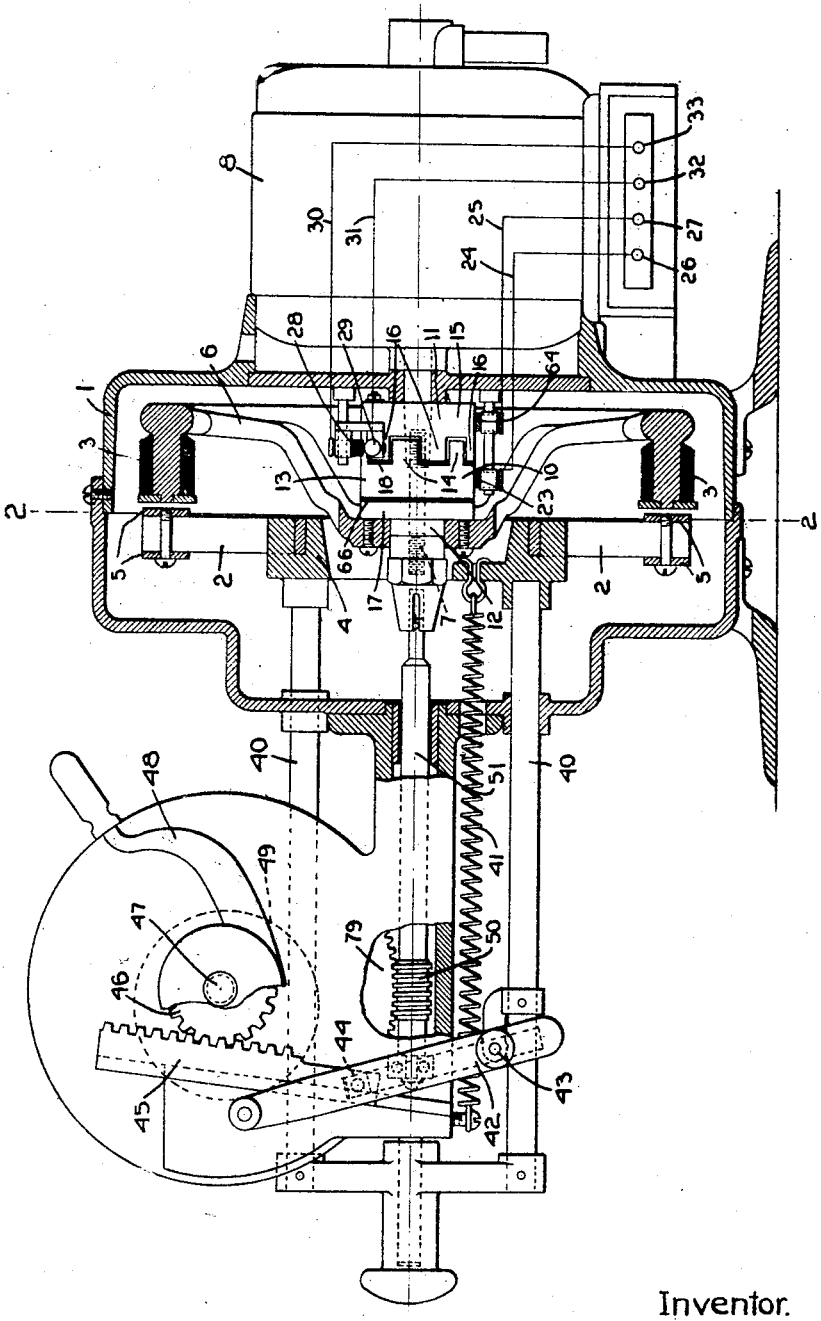

As stated above, my apparatus is of the type comprising a plurality of magnets, a plurality of coils rotatively mounted relative to said magnets, and means to move the magnets periodically toward and from the coils. The magnets and coils are enclosed within a suitable casing 1, the magnets being shown at 2 and the coils at 3. The magnets herein illustrated are of the horse-shoe variety and are arranged in a manner similar to that shown in my above-mentioned patent, that is, they are supported in a central support or carrier 4 and are arranged with their pole pieces directed outwardly. These magnets are arranged so that the similar poles of adjacent magnets are adjacent to each other, and a common pole piece may therefore be used for the two similar poles of two adjacent magnets. These pole pieces are indicated at 5, and they are arranged so that they alternate in sign, every other pole piece being an N pole piece and the other pole pieces being S pole pieces.

The coils 3 are carried by a spider or rotating member 6, which is mounted on the shaft 7 of a suitable motor 8, said motor operating to rotate the coils relative to the magnets, thereby to induce current in the coils. The coils are all connected in series and the adjacent coils are oppositely wound. This is perhaps best shown in Fig. 4 which is a diagrammatic view illustrating the relative arrangement of coils and magnets. In this view the coils are shown as situated outside of the pole pieces, but this is done merely to illustrate the relation between the coils and pole pieces. For convenience in describing the apparatus, I will use the reference letter $a$ to indicate those coils 3 which are wound in one direction, and the reference letter $b$ to indicate the other coils which are wound in the opposite direction. the $a$ coils and $b$ coils are arranged alternately, as shown in Fig. 4. There are the same number of coils as there are pole pieces, and therefore when the $a$ coils are opposite the S pole pieces, the $b$ coils will be opposite the N pole pieces. This is the condition illustrated in Fig. 4, and at such time each pole piece will induce current in the same direction in the coil which is adjacent thereto. When the coils are rotated one step forward so as to bring the $b$ coils adjacent the S pole pieces, then each pole piece will induce in its adjacent coil a current in the opposite direction. As a result, the rotation of the coils will develop an alternating current in the circuit 9 containing these coils.

One feature of my present invention relates to a novel construction for converting this alternating current into a direct current so that either alternating or direct current may be delivered from the apparatus. The shaft of the motor 7 has fast thereon a collector ring comprising the two sections 10 and 11, which are insulated from each other and from the shaft. These collector ring sections are shown as supported on a sleeve 12 which is fast to the motor shaft. The ring section 10 has a body portion provided with a continuous peripheral brush-receiving surface 13, and is also provided with projections 14 extending from one side face thereof, there being one-half as many projections as there are coils. The other collector ring section 11 is also provided with a body section having a continuous peripheral brush-receiving surface 15, and it is provided with similar projections 16, that are adapted to fit between the projections 14. The collector ring section 10 is placed on the sleeve 12 and is insulated therefrom by suitable insulation 66, said sleeve 12 having a shoulder or flange 17 which serves to properly position the collector ring section, and a washer 18 of insulating material is inserted between the collector ring sections, said washer being formed with notches 19 to fit around the projections 14 of the ring section 10. The two collector ring sections are secured together by one or more clamping bolts 20, which extend through and screw into the flange 17, said collector ring sections being insulated from this clamping bolt by suitable insulation 21. The collector ring section 11 is constructed so that when in place an air gap 22 will be formed between it and the sleeve 12, and the projections 14 and 16 are constructed so that there is an air space between them. One end of the circuit 9 is connected to the collector ring section 10 and the other end to the collector ring section 11. A brush 23 bears on the brush-receiving section 13, and another brush 64 bears on the brush-receiving section 15, said brushes being connected by wires 24, 25 to socket terminals indicated at 26, 27.

28 and 29 indicate two other brushes which are situated to bear on the collector rings at the points where the projections 14 and 16 alternate, and these brushes are connected by wires 30 and 31 to other socket terminals 32, 33.

This construction of collector ring is illustrated diagrammatically in Fig. 4, wherein the brush-receiving surfaces 13 and 15 are indicated as rings with which the brushes 24, 25 have contact. The alternating projections 14 and 16 are shown in Fig. 4 as situated within the rings and as connected thereto by circuit connections 34, 35. The brushes 28 and 29 are so disposed relative to each other that when one brush is in contact with a projection 14 the other brush will be in contact with a projection 16, and vice versa. The central portion of the spider member 6 is offset toward the central support or carrier 4 thereby forming a recess in which the collector ring is located. An advantage of this is that it makes a much more compact construction which is desirable in apparatus of this type.

In the operation of the device the rotation of the coils will induce an alternating current in the circuit 9, and if therefore the terminals of an outside circuit are connected to the socket terminals 26, 27 an alternating current will be delivered to said outside circuit.

Since the brushes 28 and 29 are situated to engage the projections 14 and 16 of the collector ring sections it will follow that each brush will be brought into engagement with the two collector ring sections alternately, and therefore the current which is delivered to the wire connections 30, 31 will be a direct current. Hence if the outside current is connected to the circuit terminals 32, 33 a direct current will be delivered to said outside circuit. The patient therefore can obtain either a direct current or an alternating current by plugging the outside circuit connections into either the terminals 26, 27 or the terminals 32, 33.

The machine herein shown is provided with means similar to that illustrated in my above-mentioned patent for moving the magnets 2 toward and from the coils 3 periodically, thereby to produce a surging or sinusoidal current. Since this mechanism for thus moving the magnets does not form per se any part of my present invention I do not regard it as important to describe it in detail. It will be sufficient to say that the carrier 4 for the magnets is connected to rods 40 which are slidably mounted in the casing 1 and which are acted on by a spring 41 that normally tends to separate the magnets from the coils. One of these rods 40 has a lever 42 pivoted thereto at 43, which lever is fulcrumed on a fulcrum member 44 that operates in a slot in said lever and is carried by a vertically shiftable rack 45. This rack meshes with a gear 46 loosely mounted on a shaft 47 and having a handle 48 by which it may be turned to raise and lower the rack. The shaft 47 has a cam 49 thereon which acts on the lever 42 and vibrates it, thereby vibrating the carrier 4. The shaft 47 is rotated by means of a worm gear 79 which meshes with and is driven by a worm 50 on an extension 51 of the motor shaft. This means for vibrating the carrier 4 to move the magnets toward and from the coils is substantially the same as that illustrated and described in my above-mentioned patent.

It is to be understood that the word "commutator" appearing in the claims is used broadly and is intended to cover either collector rings or a commutator having the usual segments or a collector unit having both collector rings and a segmental commutator.

I claim:

1. In an electric dynamo machine, the combination with a plurality of magnets supported from a hollow hub, of a plurality of coils, means supporting the coils in position to present their poles to the magnets, said means being shaped to extend into the hollow hub and provide a recess, a commutator located in the recess, electric connections between the coils and the commutator and brushes to take the electricity from the commutator.

2. In an electric dynamo machine, the combination with a plurality of magnets supported from a hollow hub, of a plurality of coils, means supporting the coils in position to present their poles to the magnets, said means being inclined toward the magnets to extend into the hollow hub and provide a recess, a commutator located in the recess, electric connections between the coils and the commutator and brushes to take the electricity from the commutator.

3. In an electric dynamo machine, the combination with a plurality of magnets, of a plurality of coils, a hollow hub supporting a plurality of coils, a hollow hub supporting the magnets to move said magnets toward and away from the coils, means supporting the coils in position to present their poles to the magnets, said means being inclined at the central portion toward the magnets to provide a recess and to extend into the hollow hub when said hub is moved to bring said magnets near said coils, a commutator located in the recess, electric connections between the coils and the commutator, and brushes to take the electricity from the commutator.

4. In an electric dynamo machine, the combination with a plurality of magnets supported from a hollow hub, of a plurality of coils, a rotatable shaft, a spider fast on the shaft and on which the coils are mounted, the central portion of the spider member being offset toward the hub thereby to form a recess, a commutator located in the recess, electric connections between the coils and the commutator, and brushes to take electricity from the commutator.

In testimony whereof, I have signed my name to this specification.

RALPH W. CHAPMAN.